United States Patent
Boswell et al.

(10) Patent No.: US 6,811,823 B2
(45) Date of Patent: Nov. 2, 2004

(54) HYDROPHOBING SILICA WITH ORGANOSILICON COMPOUNDS AND BLENDS THEREOF

(75) Inventors: Lisa Marie Boswell, Auburn, MI (US); Csilla Kollar, Midland, MI (US); Anthony Revis, Freeland, MI (US); Anil Kumar Tomar, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 76 days.

(21) Appl. No.: 10/355,752

(22) Filed: Jan. 31, 2003

(65) Prior Publication Data

US 2004/0052939 A1 Mar. 18, 2004

(51) Int. Cl.$^7$ ................................................ B05D 3/02
(52) U.S. Cl. ..................................................... 427/387
(58) Field of Search ......................................... 427/387

(56) References Cited

U.S. PATENT DOCUMENTS

| | | | | |
|---|---|---|---|---|
| 4,072,796 A | * | 2/1978 | Reinhardt et al. | 428/405 |
| 4,985,477 A | * | 1/1991 | Collins et al. | 523/212 |
| 5,008,305 A | * | 4/1991 | Kennan et al. | 523/212 |
| 5,908,660 A | | 6/1999 | Griffith et al. | 427/220 |
| 6,051,672 A | | 4/2000 | Burns et al. | 528/10 |
| 6,384,125 B1 | | 5/2002 | Bergstrom et al. | 524/492 |
| 6,613,139 B1 | * | 9/2003 | Revis | 106/490 |
| 6,706,398 B1 | * | 3/2004 | Revis | 428/405 |

FOREIGN PATENT DOCUMENTS

| | | |
|---|---|---|
| EP | 0 236 674 B1 | 2/1994 |
| WO | WO 01/21715 A1 | 3/2001 |

\* cited by examiner

*Primary Examiner*—Erma Cameron
(74) *Attorney, Agent, or Firm*—Jim L. De Cesare

(57) ABSTRACT

Silica surfaces are contacted with compositions containing organosilicon compounds to prepare modified silica fillers. The compositions contain only organosilicon compounds which are monomeric dichlorosilanes and trialkoxysilanes. The treating compositions may be (i) mixtures or blends of dialkyldichlorosilanes, and trialkoxysilanes free of hydrocarbon or organofunctional groups reactive with silica surfaces, or (ii) mixtures or blends of substituted dialkyldichlorosilanes in which the substituted dialkyldichlorosilanes are free of hydrocarbon or organofunctional groups reactive with silica surfaces, and trialkoxysilanes free of hydrocarbon or organofunctional groups reactive with silica surfaces. These mixtures and blends contain dialkyldichlorosilanes and trialkoxysilanes in a weight ratio of 1:0.1 to 1:2, respectively.

5 Claims, No Drawings

HYDROPHOBING SILICA WITH ORGANOSILICON COMPOUNDS AND BLENDS THEREOF

FIELD OF THE INVENTION

This invention is related to a method of making a modified silica filler in which silica is contacted with a blend or mixture of (i) a dialkyldichlorosilane and (ii) a trialkoxysilane free of groups reactive with a silica surface, in a weight ratio of 1:0.1 to 1:2, respectively.

BACKGROUND OF THE INVENTION

This is an improvement in methods of modifying silica fillers as described in, for example, U.S. Pat. No. 6,384,125 (May 7, 2002) assigned to the same assignee as the present invention. While the '125 patent refers generally to the use of some similar organometallic compounds and mixtures thereof as the present invention, and their use as hydrophobing agents for silica, it does not describe any particular mixture or blend of organosilicon compounds as being any more effective than any other blend, nor does the '125 patent teach that a particular ratio of organosilicon compounds is necessary to achieve new and unexpected results, i.e., the ability to deposit more siloxane on silica, vis a viz, improved hydrophobicity.

In addition, the '125 patent fails to teach using only dialkyldichlorosilanes and trialkoxysilanes free of groups reactive with silica surfaces. Rather, the '125 patent requires a second component referred to as a functionalizing coupling agent containing groups such as vinyl, allyl, hexenyl, epoxy, glycidoxy, and (meth)acryloxy.

SUMMARY OF THE INVENTION

The invention is directed to a method of making modified silica fillers in which silica is contacted with a blend or mixture of organosilicon compounds. In particular, the invention is an improvement and consists of treating silica surfaces with compositions in which the organosilicon compounds in the compositions are only of types of structural groups of monomeric dichlorosilanes and trialkoxysilanes. The organosilicon compounds in the compositions may be mixtures and blends of substituted or unsubstituted dialkyldichlorosilanes, and trialkoxysilanes free of groups reactive with silica surfaces. The mixtures and blends contain (i) a dialkyldichlorosilane and (ii) a trialkoxysilane free of groups reactive with a silica surface, in a weight ratio of 1:0.1 to 1:2, respectively. Preferably, the weight ratio is 1:0.3 to 1:1, and most preferably the weight ratio is 1:0.5.

These and other features of the invention will become apparent from a consideration of the detailed description.

DETAILED DESCRIPTION OF THE INVENTION

The silica used to make modified silica fillers herein is a colloidal, precipitated, xerogel, or fumed silica of the type used to formulate polymeric compositions such as rubber, particularly those rubber compositions used in manufacturing vehicle tires to improve the mechanical properties of the tire rubber. Such silicas are described in detail in the '125 patent which is incorporated herein by reference.

Thus, it is known that mineral fillers such as silica, having small particle size and large surface area, are capable of increasing the tensile strength of rubber compounds. Therefore, such fillers are useful as reinforcing materials for rubber, particularly when the mineral surface of the filler is converted to a hydrophobic low energy surface.

The organosilicon compounds used as silica treating agents according to the invention are mixtures and blends of dialkyldichlorosilanes and trialkoxysilanes, both preferably being free of hydrocarbon or organofunctional groups reactive with silica surfaces. The organosilicon compounds may contain alkyl groups, cycloalkyl groups, and certain substituted groups which are not reactive with respect to silica surfaces. As used herein, and as is commonly accepted in the art, the term alkyl does not include or encompass aryl, and therefore alkyl specifically excludes aryl.

Some examples of alkyl groups are methyl, ethyl, propyl, butyl, hexyl, octyl, decyl, dodecyl, octadecyl, and nonadecyl. Some examples of cycloalkyl groups are cyclobutyl and cyclohexyl. Some examples of substituted groups which are not reactive with respect to silica surfaces are halogenated alkyl groups such as chloromethyl, dichloromethyl, trichloromethyl, 3-chloropropyl, and chlorocyclohexyl; alkyl groups containing alkoxy radicals such as methoxy, ethoxy, butoxy, and pentoxy; alkyl groups containing sulfido (—S—), disulfido, or polysulfido radicals; and alkyl groups containing cyano (—C≡N) radicals.

Representative of some suitable dialkyldichlorosilanes are n-decylmethyldichlorosilane, di-n-butyldichlorosilane, diethyldichlorosilane, di-n-hexyldichlorosilane, di-isopropyldichlorosilane, dimethyldichlorosilane (DMDCS), di-n-octyldichlorosilane, docosylmethyldichlorosilane, dodecylmethyldichlorosilane, ethylmethyldichlorosilane, n-heptylmethyldichlorosilane, hexylmethyldichlorosilane, isopropylmethyldichlorosilane, n-octadecylmethyldichloroilane, n-octylmethyldichlorosilane, and n-propylmethyldichlorosilane.

Representative of some suitable trialkoxysilanes are benzyltriethoxysilane, 2-chloroethyltriethoxysilane, (p-chloromethyl)phenyltrimethoxysilane, (p-chloromethyl)phenyltri-n-propoxysilane, chloromethyltriethoxysilane, chloromethyltrimethoxysilane, chlorophenyltriethoxysilane, 3-chloropropyltriethoxysilane (CPTES), 3-chloropropyltrimethoxysilane, 2-cyanoethyltriethoxysilane, 2-cyanoethyltrimethoxysilane, 3-cyanopropyltriethoxysilane, 3-cyanopropyltrimethoxysilane, 11-cyanoundecyltrimethoxysilane, cyclohexyltrimethoxysilane, ethyltriethoxysilane, ethyltrimethoxysilane, 3-mercaptopropyltriethoxysilane (MPTES), 3-mercaptopropyltrimethoxysilane, methyltriethoxysilane, methyltrimethoxysilane, pentyltriethoxysilane, phenethyltrimethoxysilane, phenyltriethoxysilane, phenyltrimethoxysilane, n-propyltriethoxysilane, n-propyltrimethoxysilane, and p-tolyltrimethoxysilane.

A general method of making modified silica fillers is described below in Example A, although the modified silica fillers can be made by known and accepted techniques such as are described in the '125 patent, U.S. Pat. No. 5,908,660 (Jun. 1, 1999), and U.S. Pat. No. 6,051,672 (Apr. 18, 2000). While these patents describe other general methods, they fail to describe the features of this invention, i.e., the use of a particular mixture or blend of organosilicon compound(s) in a particular ratio.

When the modified silica fillers herein are used in rubber compositions for the manufacture of vehicle tires, other conventional additives may be included such as other fillers including carbon black; oils; plasticizers; accelerators; antioxidants; heat stabilizers; light stabilizers; zone stabilizers; extenders; and coloring pigments.

EXAMPLES

The following examples illustrate the invention in more detail. The silica slurry used in these examples contained 6.5 percent by weight of silica. It is a commercial product of PPG Industries, Inc., Pittsburgh, Pa. Neutralization was carried out with a standard solution containing 25 percent by weight of sodium hydroxide. The standard solution was prepared by dissolving 1,000 grams of sodium hydroxide pellets in 3,000 milliliter of deionized water.

The apparatus used to treat silica consisted of a 5-liter round-bottom reaction flask. The flask was equipped with ball joints, a Teflon® shaft stirring paddle, an overhead electrical stirring motor, and a Type-K thermocouple temperature controller with a flexible heating mantle. The top of the reaction flask contained a Dean-Stark trap and water cooled condenser with a port for a sealed glass thermocouple well submersed in the reaction flask. The third neck of the reaction flask was sealed with either a ball-joint cap or an addition funnel. A 253 mm Coors Porcelain Buchner funnel containing Whatman filter paper was used to filter and wash the treated silica fillers and silica filler cakes The Buchner funnel was mounted on a 4-liter filter flask. A Fisher brand Digital Conductivity Meter was used to measure the conductivity of filtrate from the washing process. The pH was measured with a Mettler Toledo Portable pH\Ion Meter, Model No. MP125.

The following procedure was used in Example 6 and represents the general procedure repeated in Examples 1–5. Data for each Example 1–6 is shown in Table 1.

Example A

A General Procedure for Examples 1–6

The reaction flask was charged with 2000 gram of silica slurry and 165 gram of concentrated sulphuric acid. The slurry was heated to 70° C. and then the heat was turned off. At this time, a mixture containing 8.8 gram of 3-mercaptopropyltriethoxysilane (MPTES) and 23.8 gram of dimethyldichlorosilane (DMDCS) was added directly to the reaction flask through a long-stem funnel. The mixture was added in a rapid fashion over a period of about 2–7 minutes. The treated slurry was then stirred for one hour as it cooled to room temperature.

A 600 milliliter solution of 25 percent by weight sodium hydroxide was added to the stirred slurry to adjust the pH within a range of 3.4–3.7. The neutralized slurry was transferred to the Buchner funnel and vacuum filtered to removed the aqueous phase. The filter cake was washed repeatedly with large amounts of water until the filtrate provided a reading of less than 100 micro-ohms. After air-drying overnight, the filter cake was transferred to a plastic pail with a lid and spray dried as follows.

The air-dried treated silica was re-slurried in deionized water to a content of 20–40 percent by weight of the treated silica. The slurry was mixed until all of the solids were broken. The slurry was pumped to a Niro Atomizer spray drier at a rate of about 20 ml/minute. The spray drier had an inlet temperature of 260° C. and an outlet temperature between 120–140° C. A dried treated silica product was collected and stored in a glass jar.

The silica surface treatment level, i.e., the concentration of dimethylsiloxy, was quantified by Gas Chromatography (GC). Elemental analysis of treated silicas was conducted by an independent testing laboratory. The elemental analyses for treated silicas in Examples 1–6 are shown in Table 1. The following acronyms are used in Table 1. MPTES represents 3-mercaptopropyltriethoxysilane $HS-CH_2CH_2CH_2-Si(OC_2H_5)_3$, DMDCS represents dimethyldichlorosilane $(CH_3)_2SiCl_2$, and CPTES represents 3-chloropropyltriethoxysilane $Cl(CH_2CH_2CH_2Si(OC_2H_5)_3$. The asterisk * in Table 1 for the percent loss obtained in Example 6 indicates that the % Loss for that example was obtained by titration rather than by Percent Carbon.

TABLE 1

| Examples | Gram DMDCS | Gram MPTES | Gram CPTES | Dimethylsiloxy Concentration and Percent Carbon | | |
|---|---|---|---|---|---|---|
| | | | | Theory | Actual | % Loss |
| 1 Comparison | 25.0 | | | 10.11 | 5.53 | 45 |
| 2 Comparison | 30.0 | | | 12.43 | 6.84 | 45 |
| 3 Invention | 25.1 | | 8.0 | 9.72 | 7.40 | 24 |
| 4 Invention | 23.8 | 7.6 | | 9.82 | 7.35 | 25 |
| 5 Invention | 23.8 | 7.9 | | 9.82 | 6.57 | 33 |
| 6 Invention | 19.6 | 6.25 | 1.0 | — | — | 25* |

In Table 1, Examples 1 and 2 are Comparison Examples, and Examples 3–6 represent the present invention. In particular, Comparison Example 1 shows the yield that can be obtained in terms of a loss of 45 percent using only dialkyldichlorosilanes such as dimethyldichlorosilane (DMDCS). Comparison Example 2 provides verification of the high loss in Comparison Example 1, showing a loss of 45 percent. By comparing Examples 1 and 2 with Examples 3–6, one can readily appreciate the benefits obtained using the blended compositions according to the invention, i.e., a significantly improved deposition yield can be realized.

With respect to Example 6 in particular, it should be noted that the presence of greater amounts of MPTES is recognized in the tire industry as being especially beneficial in that it improves the mechanical properties of the tire rubber. As shown in Example 6, a loss of only 25 percent means that significant portions of MPTES were captured for improving the modulus, which is one of the mechanical properties indicating rubber toughness.

Other commonly assigned copending applications directed to silica treatments include (i) U.S. patent application Ser. No. 10/199,400, filed Jul. 18, 2002, entitled "Tetrahalosilane Blends for Treating Silica"; (ii) U.S. patent application Ser. No. 10/199,403, filed Jul. 18, 2002, entitled "Chlorosilane Blends for Treating Silica"; and (iii) U.S. patent application Ser. No. 10/243,339, filed the same day as the present application, entitled "Organosilicon Compounds and Blends for Treating Silica". However, none of these commonly assigned copending applications are directed to the treatment of silica as claimed in the present application.

Other variations may be made in compounds, compositions, and methods described herein, without departing from the essential features of the invention. The embodiments specifically illustrated herein are exemplary only and not intended as limitations in scope except as defined in the appended claims.

What is claimed is:

1. In a method of making modified silica fillers in which silica surfaces are contacted with compositions containing organosilicon compounds, the improvement comprising treating silica surfaces with a composition containing organosilicon compounds comprising only monomeric dialkyldichlorosilanes and trialkoxysilanes, the compositions being (i) mixtures or blends of dialkyldichlorosilanes, and trialkoxysilanes free of hydrocarbon or organofunctional groups reactive with silica surfaces, or (a) mixtures or blends of substituted dialkyldichlorosilanes in which the substituted dialkyldichlorosilanes are free of hydrocarbon or organofunctional groups reactive with silica surfaces, and in which the trialkoxysilanes are free of hydrocarbon or organofunctional groups reactive with silica surfaces; the mixtures and blends (i) and (ii) containing the dialkyldichlorosilanes and the trialkoxysilanes being in a weight ratio of 1:0.1 to 1:2, respectively.

2. A method according to claim 1 in which the weight ratio is 1:0.3 to 1:1.

3. A method according to claim 2 in which the weight ratio is 1:0.5.

4. A method according to claim 1 in which the mixtures and blends contain dialkyldichlorosilanes selected from the group consisting of n-decylmethyldichlorosilane, di-n-butyldichlorosilane, diethyldichlorosilane, di-n-hexyldichlorosilane, di-isopropyldichlorosilane, dimethyldichlorosilane, di-n-octyldichlorosilane, docosylmethyldichlorosilane, dodecylmethyldichlorosilane, ethylmethyldichlorosilane, n-heptylmethyldichlorosilane, hexylmethyldichlorosilane, isopropylmethyldichlorosilane, n-octadecylmethyldichloroilane, n-octylmethyldichlorosilane, and n-propylmethyldichlorosilane.

5. A method according to claim 1 in which the mixtures and blends contain trialkoxysilanes free of groups reactive with silica surfaces selected from the group consisting of benzyltriethoxysilane, 2-chloroethyltriethoxysilane, (p-chloromethyl)phenyltrimethoxysilane, (p-chloromethyl)phenyltri-n-propoxysilane, chloromethyltriethoxysilane, chloromethyltrimethoxysilane, chlorophenyltriethoxysilane, 3-chloropropyltriethoxysilane, 3-chloropropyltrimethoxysilane, 2-cyanoethyltriethoxysilane, 2-cyanoethyltrimethoxysilane, 3-cyanopropyltriethoxysilane, 3-cyanopropyltrimethoxysilane, 11-cyanoundecyltrimethoxysilane, cyclohexyltrimethoxysilane, ethyltriethoxysilane, ethyltrimethoxysilane, 3-mercaptopropyltriethoxysilane, 3-mercaptopropyltrimethoxysilane, methyltriethoxysilane, methyltrimethoxysilane, pentyltriethoxysilane, phenethyltrimethoxysilane, phenyltriethoxysilane, phenyltrimethoxysilane, n-propyltriethoxysilane, n-propyltrimethoxysilane, and p-tolyltrimethoxysilane.

* * * * *